Figure 1:
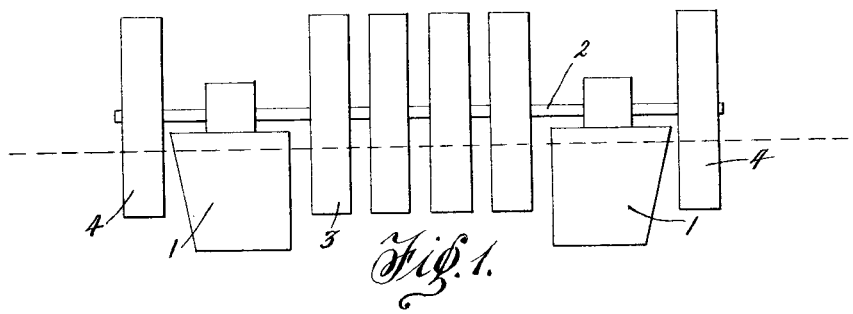

C. J. DUNCAN.
WATER WHEEL.
APPLICATION FILED NOV. 10, 1910.

1,031,430.

Patented July 2, 1912.

Inventor
C. J. Duncan.

Witnesses

By

Attorneys

UNITED STATES PATENT OFFICE.

CLARK J. DUNCAN, OF WINDBER, PENNSYLVANIA.

WATER-WHEEL.

1,031,430.  Specification of Letters Patent.  Patented July 2, 1912.

Application filed November 10, 1910. Serial No. 591,701.

*To all whom it may concern:*

Be it known that I, CLARK J. DUNCAN, a citizen of the United States of America, residing at Windber, in the county of Somerset and State of Pennsylvania, have invented certain new and useful Improvements in Water-Wheels, of which the following is a specification, reference being had therein to the accompanying drawing.

This invention relates to water wheels, and more particularly to a wheel designed for use in connection with that type of water motor shown and described in my application for patent filed Nov. 3rd, 1908, Serial No. 460,949.

The object of the present invention is to provide a novel bladed wheel that can be smoothly driven or revolved when immersed or partially immersed in the current of a stream or body of water.

Another object of the invention is to arrange the blades of a wheel, whereby a high degree of power or efficiency can be obtained by a minimum amount of water impacting the blades of a wheel.

A further object of the invention is to provide a wheel with a plurality of circumferentially arranged propelling blades disposed at an inclination to be propelled by a current of water, without interfering with the flow of that portion of the current that does not strike blades positioned for propelling purposes. In other words, my wheel has been designed to eliminate the chopping or agitating of water during its operation.

The above objects are attained by providing a wheel that can be used in a body of water for generating power for various purposes, but I desire to identify my wheel with the motor described in the above mentioned application, since the wheel has been particularly designed for such form of motor.

Figure 2:
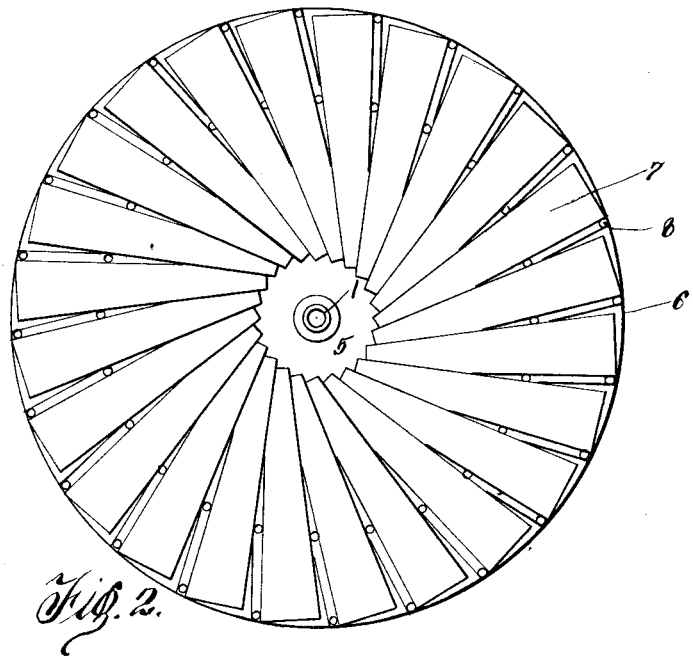
Figure 3:
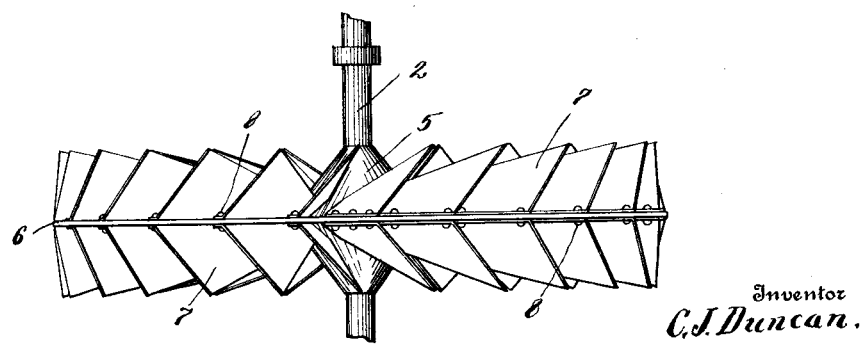

In describing the invention in detail, reference is had to the accompanying drawings wherein like reference characters denote corresponding parts throughout the several views and in which:

Figure 1 is an elevation showing the adaptation of a plurality of water wheels in accordance with this invention supported upon an anchored structure. Fig. 2 is a side elevation of one of the wheels, and, Fig. 3 is a plan view thereof.

Referring in detail to the drawings, a water wheel in accordance with this invention includes a double cone-shaped hub 5 provided with a central metallic disk 6. Secured to the sides of the disk 6 are a plurality of tangentially disposed blades 7 having their inner edges riveted or otherwise secured, as at 8, to the disk 6. These blades extend from the hub 5 to the periphery of the disk 6 and gradually taper from the periphery of the disk 6 toward the hub of said disk, whereby the inner ends of the blades will overlap, and provide tapering pockets upon each side of the disk 6. Each blade is disposed at an angle relative to the disk 6 with the blades upon one side of the disk at a reverse angle to the blades upon the opposite side, whereby two oppositely disposed blades will provide substantially a V-shaped pocket gradually diminishing in cross-section toward the hub of the wheel, the pocket being divided throughout its length by the disk 6.

Assuming that the water wheel is immersed in a current of water to the height indicated by the dotted line in Fig. 1 of the drawings, it will be observed that the upper surface of the current can freely pass between the blades through the pockets at each side of the disk 6, but that the lower part of the current impacts against the blades as they gradually assume a position approximately vertical relative to the surface of the current, since it is a well known fact that the under-current, particularly in channels, is stronger than the upper part of the current, that the shape of the pockets of the wheel would take care of such currents, since the pockets are of a greater area or capacity at the lower edge of the wheel than at the hub, also because the outer ends of the blades have a greater distance to travel than the inner ends of the blades when actuated by two coöperating portions of the current of water.

Assuming now that the wheel in its entirety was submerged, the inclination of the blades relative to the disk 6 permits those blades moving against the current to easily deflect the current, while the opposite blades receive the full impact of the current, and those blades at a horizontal plane with the current allowing the current to freely pass between said blades.

My wheel has been particularly designed for streams of water having swift currents, where it is possible to anchor the structure 1 and utilize the revolving movement of the shaft 2 for driving by the pulleys 4 a suitable mechanism either in the form of a generator or air compressor, whereby electricity or compressed air could be utilized in the vicinity for various purposes. It is in this connection, that the structure 1 could be anchored in the ocean near the shore where an undertow occurs, which would actuate one set of blades, while in-rolling waves would actuate another set of blades.

I reserve the right to position the water wheels upon the shaft 2, whereby the full force of the current will impinge the wheels and drive the shaft 2 to a high degree of speed without materially interfering with the current, thus permitting the current being utilized for other purposes, for instance, other water wheels located below and in this manner obtain power that would be otherwise wasted.

Having now described my invention what I claim as new, is:—

A water wheel comprising a shaft, a double cone-shaped hub mounted upon said shaft, a disk secured to said hub centrally thereof, a plurality of tangentially-disposed inclined tapering blades carried by each side of said disk and each of a length to extend from the hub to the edge of the disk, the blades upon one side of said disk having their inner longitudinal edges opposing the inner longitudinal edges of the blades upon the other side of the disk, said blades being of greater width at the periphery of the disk and gradually decreasing in width to the hub, the blades upon one side of the disk being so disposed with respect to the blades upon the other side of the disk to provide a series of tapering V-shaped pockets extending from the edge of the disk to said hub and with the disk constituting a centrally-disposed partition for each of the pockets.

In testimony whereof I affix my signature in the presence of two witnesses.

CLARK J. DUNCAN.

Witnesses:
  KARL H. BUTLER,
  MAX H. SROLOVITZ.

Copies of this patent may be obtained for five cents each, by addressing the "Commissioner of Patents, Washington, D. C."